(12) United States Patent
Nakae et al.

(10) Patent No.: US 9,461,819 B2
(45) Date of Patent: Oct. 4, 2016

(54) INFORMATION SHARING SYSTEM, COMPUTER, PROJECT MANAGING SERVER, AND INFORMATION SHARING METHOD USED IN THEM

(75) Inventors: Masayuki Nakae, Tokyo (JP); Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1570 days.

(21) Appl. No.: 12/601,430

(22) PCT Filed: May 19, 2008

(86) PCT No.: PCT/JP2008/059137
§ 371 (c)(1),
(2), (4) Date: Apr. 7, 2010

(87) PCT Pub. No.: WO2008/146639
PCT Pub. Date: Dec. 4, 2008

(65) Prior Publication Data
US 2011/0179412 A1    Jul. 21, 2011

(30) Foreign Application Priority Data

May 23, 2007    (JP) .................................. 2007-136069

(51) Int. Cl.
*G06F 21/00*  (2013.01)
*H04L 9/08*  (2006.01)
*G06F 21/53*  (2013.01)
(Continued)

(52) U.S. Cl.
CPC ............... *H04L 9/083* (2013.01); *G06F 21/53* (2013.01); *G06Q 10/06* (2013.01); *H04L 9/321* (2013.01)

(58) Field of Classification Search
USPC ............ 705/51, 16, 21, 59, 71; 380/44, 262, 380/278, 279
See application file for complete search history.

(56) References Cited

U.S. PATENT DOCUMENTS

| 7,210,043 | B2 | 4/2007 | Miyazaki et al. |
| 2002/0092003 | A1* | 7/2002 | Calder et al. ................. 717/138 |
| 2004/0153642 | A1* | 8/2004 | Plotkin ................... G06F 21/85 713/150 |

(Continued)

FOREIGN PATENT DOCUMENTS

| JP | 2002-318719 A | 10/2002 |
| JP | 2004-259262 A | 9/2004 |
| JP | 2006-201845 A | 8/2006 |

OTHER PUBLICATIONS

"Technical Overview of Windows Rights Management Services for Windows Server 2003", Microsoft Corporation, Published Nov. 2003, Apr. 2005, pp. 22-23.

(Continued)

*Primary Examiner* — Dante Ravetti
(74) *Attorney, Agent, or Firm* — Sughrue Mion, PLLC

(57) ABSTRACT

A project managing unit 11 authenticates users of virtual machines 24-1 to 24-N and specifies a project to which the users belong. A key managing unit 12 distributes an encryption key, which is assigned in advance to the project specified by the project managing unit 11, to encryption processing units 232-1 to 232-N of virtualizing units 23-1 to 23-N. Input/output monitoring units 231-1 to 231-N of the virtualizing units 23-1 to 23-N receive input/output data generated between the virtual machines 24-1 to 24-N and devices 22-1 to 22-N, and deliver the data to the encryption processing units 232-1 to 232-N. The encryption processing units 232-1 to 232-N encrypt output (write) data and decrypt input (read) data by using the distributed encryption key.

4 Claims, 11 Drawing Sheets

(51) Int. Cl.
*G06Q 10/06* (2012.01)
*H04L 9/32* (2006.01)

(56) References Cited

U.S. PATENT DOCUMENTS

| | | |
|---|---|---|
| 2005/0256999 A1 | 11/2005 | Kishi et al. |
| 2006/0075252 A1 | 4/2006 | Kallahalla et al. |
| 2006/0112096 A1* | 5/2006 | Ahluwalia et al. ............... 707/6 |
| 2007/0089111 A1* | 4/2007 | Robinson ................ G06F 21/53 718/1 |
| 2007/0118770 A1* | 5/2007 | Kahn ..................... H04N 5/913 713/193 |

OTHER PUBLICATIONS

Yuji Watanabe et al., "Bridging the Gap Between Inter-communication Boundary and Internal Trusted Components", Proceedings of ESORICS 2006, Lecture Notes on Computer Science, pp. 1-3, vol. 4189.

USPTO Office Action dated Mar. 20, 2013 issued in co-pending U.S. Appl. No. 13/486,871.

* cited by examiner

```
<MetaData>
    <ProjectID>ProjectA</ProjectID>
    <Data>2007/03/30</Data>
```

INFORMATION SHARING SYSTEM, COMPUTER, PROJECT MANAGING SERVER, AND INFORMATION SHARING METHOD USED IN THEM

TECHNICAL FIELD

The present invention relates to an information sharing system, a computer, a project managing sever, and an information sharing method used in them, and its program, and more particularly relates to an information sharing system that attains a safe information sharing in a business project.

BACKGROUND ART

In a business project such as a software development, information sharing means such as FTP (File Transfer Protocol), Web, an electronic mail, a USB (Universal Serial Bus) memory, CD-R (Compact Disc-Recordable)/DVD-R (Digital Versatile Disc-Recordable) are generally used for the sake of information sharing among project members.

However, the raise of importance of compliance and information protection in recent years requires prevention of an unallowable leakage of information to the outside of the project, such as the Internet. Thus, the use of the following techniques is increasing.

1. Content Encrypting Technique

As one example of content encrypting techniques, it is possible to list a rights management system (RMS) disclosed in a non-patent document 1 ("Technical Overview of Windows (Registered Trademark) Rights Management Services for Windows (Registered Trademark) Sever 2003" (April 2005, pp. 22-23), http://www.microsoft.com/windowsserver2003/techinfo/overview/rmenterprisewp.mspx). The rights management system has: a business application (RMS application) such as a word processor and spreadsheet program in which an encryption middleware is incorporated; and an RMS server having user authentication and key managing functions.

When a data generator shares business data with a specific data user, the RMS application and the RMS server execute encrypting and decrypting processes, in linkage with each other as described below.

(a) An RMS application of the data generator encrypts the business data and stores the encrypted business data in a secondary storage in a terminal of the data generator. Then, the RMS application generates a use license, which includes an encryption key and the like, and registers it in the RMS server.

(b) The data generator uses the aforementioned general information sharing means to share the encrypted business data with another data user.

(c) When the data user uses the encrypted business data, the RMS application requests the use license to the RMS server.

(d) The RMS server, when authenticating the data user and admitting the existence of the use right of the business data, distributes the use license to an RMS application of the data user.

(e) The RMS application of the data user, after extracting the encryption key from the distributed use license and decrypting the encrypted business data, executes a use of the business data, such as browsing and printing, in accordance with the request from the data user.

As a condition that the RMS server admits the use right of the data user at the process (d), it is possible to define an information sharing policy under which the data user belongs to a specific user group. Consequently, without depending on the information sharing means, a safe information sharing is realized which is limited to specific business project members. Therefore, neutrality from the information sharing means is retained.

2. Link Between Virtual Technique and Access Control Technique

As one example of link between virtual technique and access control technique, there is an information protecting system disclosed in a patent document 1 (Japanese Laid Open Patent Application (JP-P2006-201845A). The information protecting system contains; virtual machines classified into two types of "secret" and "general"; and a security gateway for monitoring and controlling a communication between the both virtual machines. The virtual machines and the security gateway are implemented on a user terminal in which a machine virtualizing mechanism is incorporated.

Then, in the information protecting system, since the security gateway is operated to permit only data transmissions from the general virtual machine to the secret virtual machine, business data treated by the secret virtual machine is protected from being leaked to a general virtual machine. Moreover, according to the information protecting system, when communication with an information sharing server of a business project is limited to the secret virtual machine, an information sharing limited to project members is attained.

The information protecting system is application-neutral because any application can be used in business, differently from the aforementioned RMS system. Also, since attacks from a malicious end user and a malicious soft ware is effective only in the virtual machine and has no influence on the security gateway that is operated outside the virtual machine, a robustness of the information protecting system is high.

A non-patent document 2 (Watanabe, Y., et al., "Bridging the Gap between Inter-communication Boundary and Internal Trusted Component", Proceedings of ESORICS 2006, Lecture Notes on Computer Science, vol. 4189, pp. 65-80, 2006) discloses a protecting method of an IP communication through a security gateway having a data encrypting function referred to as a secure messaging router (SMR).

However, according to the technique in the non-patent document 1, it is difficult to change all of the various applications such as a design tool, a development tool, a source code version management tool and the like into RMS applications by incorporating the encryption middleware into all of the various applications. Also, it is sufficiently considered that business data decrypted in the RMS application is illegally extracted through an attack to a vulnerability of the RMS application, such as a buffer overflow or an attack which deprives a privilege of an OS (Operating System) kernel, such as a route kit.

Also, the information protecting system disclosed in the patent document 1 does not contain data encrypting means differently from the RMS system. Thus, it cannot be prevented that a non-project member illegally peeks or steals business data on a route of information sharing, such as an IP (Internet Protocol) communication and a USB memory.

Also, the technique in the non-patent document 2 does not disclose a protecting method for secondary storage devices such as a USB memory, a CD-R, and DVD-R.

Also, in the aforementioned techniques, the access control means in the virtual layer, which contributes to the application neutrality and robustness, does not have data encrypting means that contributes to the neutrality from the information sharing means, or has the data encrypting means which are applied to only limited information sharing means. Thus, any of the aforementioned techniques has a problem that the neutrality from the information sharing means, the neutrality from the application, or the robustness is not satisfied.

DISCLOSURE OF INVENTION

An exemplary object of the present invention is to provide an information sharing system, a computer, a project managing server, an information sharing method used in them, and its program which can solve the aforementioned problem and satisfy all of the requirements of the neutrality from the information sharing means, the neutrality from the application, and the robustness.

An information sharing system includes: a computer including a virtual machine configured to provide a virtual machine environment; and a project managing server configured to communicate with the computer. The computer includes a virtualizing unit.

The virtualizing unit includes: an input/output monitoring unit which monitors input/output data between the virtual machine and a device; and an encryption processing unit which encrypts or decrypts, based on a monitoring result of the input/output monitoring unit, the input/output data in accordance with a direction of input/output by using a predetermined encryption key.

The project managing server includes: a project managing unit which manages and authenticates members of a business project based on authentication information from the computer; and a key managing unit which generates, updates, and manages an encryption key specific to the business project. The project managing server supplies the encryption key managed by the key managing unit to the computer.

According to the present invention, with the aforementioned configurations and operations, it is possible to provide an exemplary advantage that all of requirements of the neutrality from the information sharing means, the neutrality from the application, and the robustness are satisfied.

BRIEF DESCRIPTION OF DRAWINGS

The above-mentioned object, advantages and features of the present invention will be more apparent from the description of the exemplary embodiments in conjunction with the accompanying drawings, in which.

BEST MODE FOR CARRYING OUT THE INVENTION

Exemplary embodiments of the present invention will be described below with reference to the drawings. However, the present invention is not limited to the exemplary embodiments.

First Exemplary Embodiment

Figure 1:
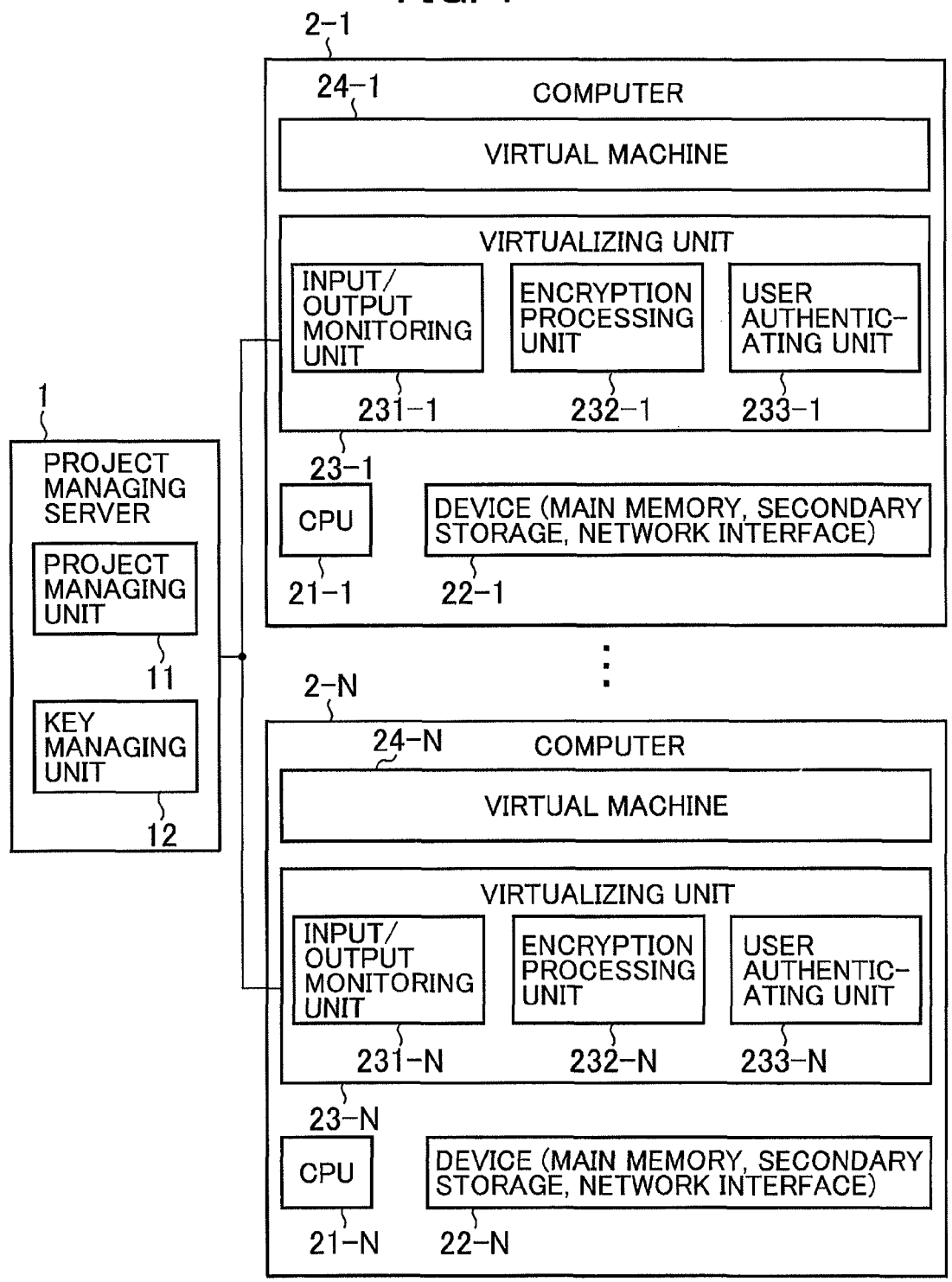
FIG. 1 is a block diagram showing a configuration example of an information sharing system according to a first exemplary embodiment of the present invention.

FIG. 1 is a block diagram showing a configuration example of an information sharing system according to a first exemplary embodiment of the present invention. In FIG. 1, the information sharing system according to the first exemplary embodiment of the present invention contains: a project managing server 1 for managing belonging members and the like, for a certain business project; and one or more computers 2-1 to 2-N that are respectively used by the belonging members.

The project managing server 1 contains a project managing unit 11 and a key managing unit 12. The computers 2-1 to 2-N contain CPUs (Central Processing Units) 21-1 to 21-N, devices 22-1 to 22-N, such as secondary storage devices, network interface devices and the like, virtualizing units 23-1 to 23-N, and virtual machines 24-1 to 24-N, respectively.

The project managing unit 11 stores a list of the belonging members in a non-volatile memory or a secondary storage device that are contained inside, and changes the list in accordance with an instruction from a project manager, such as addition or removal of a member. Also, the project managing unit 11 carries out user authentications in response to authentication requests from user authenticating units 233-1 to 233-N in the computers 2-1 to 2-N and replies the authentication results, project information, and the like to the computers 2-1 to 2-N.

The key managing unit 12 carries out processes for generating an encryption key specific to the business project when the project is newly generated, for updating the key when the project members are changed or the like, and stores the key in a non-volatile memory or a secondary storage device which are contained inside. Also, the key managing unit 12 distributes the encryption key to encryption processing units 232-1 to 232-N in the computers 2-1 to 2-N, at the times of generating and updating.

The virtual machines 24-1 to 24-N emulate hardware resources of the computers by using software to provide virtual machine environments, respectively. The virtualizing units 23-1 to 23-N contain input/output monitoring units 231-1 to 231-N, the encryption processing units 232-1 to 232-N, and the user authenticating units 233-1 to 233-N, respectively, and manage the respectively corresponding virtual machines 24-1 to 24-N.

The input/output monitoring units 231-1 to 231-N monitor data inputs/outputs generated between the virtual machines 24-1 to 24-N and the devices 22-1 to 22-N. When data are outputted to the devices 22-1 to 22-N, the input/output monitoring units 231-1 to 231-N input the data to the encryption processing units 232-1 to 232-N and instruct them to encrypt the data. Also, when the data are inputted from the devices 22-1 to 22-N, the input/output monitoring units 231-1 to 231-N input the data to the encryption processing units 232-1 to 232-N and instruct them to decrypt the data.

The encryption processing units 232-1 to 232-N receive the encryption key distributed from the key managing unit 12 and store the key in the non-volatile memories and the secondary storage devices that are contained inside. Also, the encryption processing units 232-1 to 232-N receive the data and the encrypting or decrypting instructions from the input/output monitoring units 231-1 to 231-N. In the case of the encrypting instructions, the encryption processing units 232-1 to 232-N encrypt the input data by using the encryption key and output the encrypted data to the devices 22-1 to 22-N. In the case of the decrypting instructions, the encryption processing units 232-1 to 232-N decrypt the input data by using the encryption key and output the decrypted data to the virtual machines 24-1 to 24-N.

The user authenticating units 233-1 to 233-N receive the input of authentication information, such as a user ID (Identifier), a password and the like from an end user, through the devices 22-1 to 22-N for user input/output, such as LCD (Liquid Crystal Display), a keyboard and the like, before the virtual machines 24-1 to 24-N are started, for example, at the starts of the computers 2-1 to 2-N.

Also, the user authenticating units 233-1 to 233-N input the authentication information to the project managing unit 11 in the specific project managing server 1, and request an authentication as to whether or not the end user is a member of the specific project. When there is a reply of the success of the authentication, the user authenticating units 233-1 to 233-N start the virtual machines 24-1 to 24-N.

Figure 2:
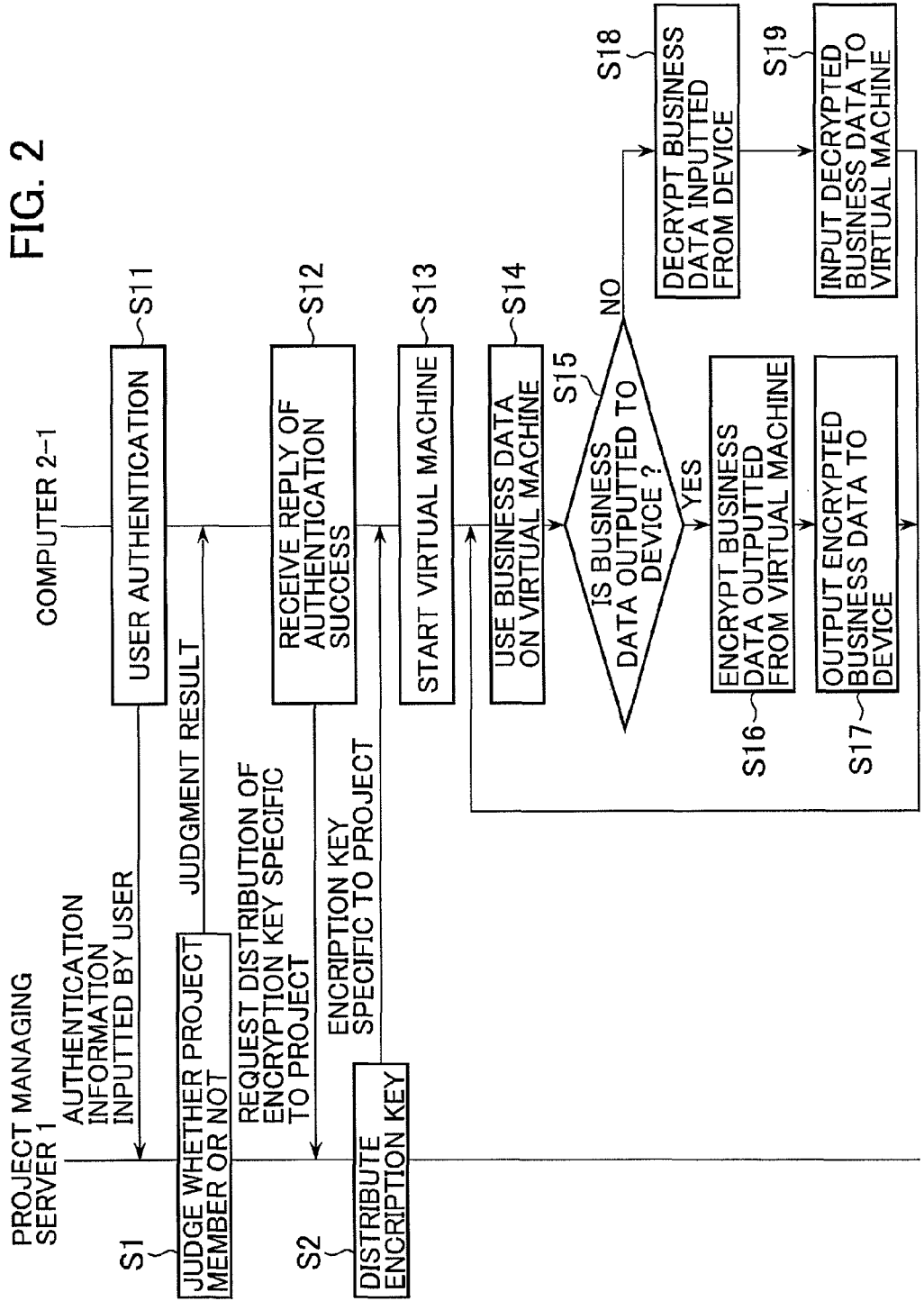
FIG. 2 is a sequence chart showing operations of the information sharing system according to the first exemplary embodiment of the present invention.
Figure 3:
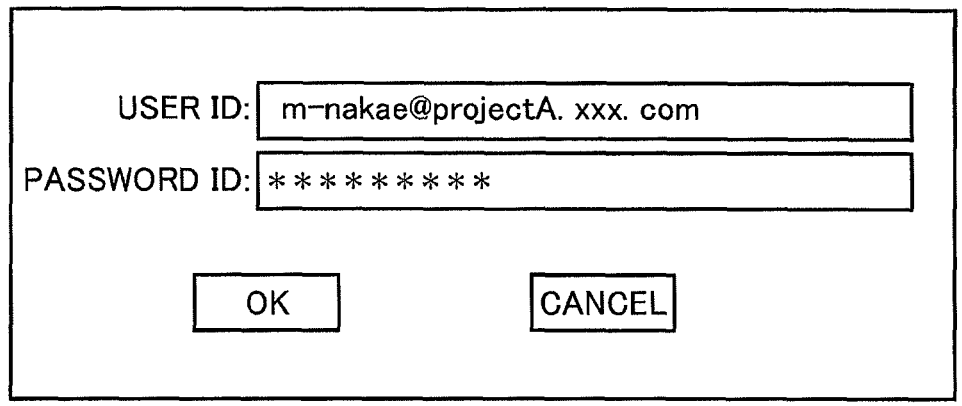
FIG. 3 shows an example of a user authentication screen of the information sharing system according to the first exemplary embodiment of the present invention.

FIG. 2 is a sequence chart showing operations of the information sharing system according to the first exemplary embodiment of the present invention. FIG. 3 shows an example of a user authentication screen in the information sharing system according to the first exemplary embodiment of the present invention. Operations of the information sharing system according to the first exemplary embodiment of the present invention will be described with reference to FIGS. 1 to 3. By the way, the respective operations of the project managing server 1 and the computer 2-1 can be implemented by executing programs executable by computers.

At first, when the computer 2-1 is started, the user authenticating unit 233-1 of the virtualizing unit 23-1 transmits authentication information inputted by a user to the project managing unit 11 of the project managing server 1 (Step S11 in FIG. 2).

For the input of the authentication information at the step S11, for example, there is a method in which a user input/output device such as LCD, a keyboard and the like is used, the authentication information input screen as shown in FIG. 3 is displayed, and the input of the authentication information such as the user ID, the password, and the like is received. Also, as another method, the input of the authentication information may be received through an authenticating device such as a USB (Universal Serial Bus) key or the like.

Also, it is required to input location information of the project managing server 1, such as an IP (Internet Protocol) address, URL (Uniform Resource Locator) or the like, to the user authenticating unit 233-1. For example, as shown in FIG. 3, at the input of the user ID, a format can be requested in which the user ID (m-nakae) and a domain name (projectA.xxx.com) of the project managing server 1 are combined. As another method, the location information may be recorded in the authenticating device in advance.

Next, the project managing unit 11 of the project managing server 1 compares the aforementioned authentication information with authentication information of the project members, which is registered in advance, to judges whether or not the user of the computer 2-1 is a member, and then replies its result to the user authenticating unit 233-1 of the computer 2-1 (Step S1 in FIG. 2).

The user authenticating unit 233-1, when receiving the reply of the success of the authentication from the project managing unit 11, requests the key managing unit of the project managing server 1 to distribute the encryption key specific to the project (Step S12 in FIG. 2). On the other hand, the user authenticating unit 233-1, when receiving the reply of the failure of the authentication, returns to the process of the user authentication in the step S11.

When receiving the request of distribution of the encryption key specific to the project from the user authenticating unit 233-1, the key managing unit 12 distributes the encryption key which is generated in advance to the encryption processing unit 233-1 of the computer 2-1 as a requester (Step S2 in FIG. 2). The encryption processing unit 233-1 stores the encryption key in a non-volatile memory or a secondary storage device that is contained inside.

After the storing of the encryption key has been completed by the encryption processing unit 233-1, the virtualizing unit 23-1 starts the virtual machine 24-1 (Step S13 in FIG. 2). Hereafter, the user of the computer 2-1 generates and edits business data by using arbitrary OS (Operating System) and application which are operated on the virtual machine 24-1, and shares the business data with the other computers 2-2 to 2-N at any time.

During such activities, for the sake of saving and reading the business data, for the sake of transmitting and receiving the business data to and from the other computers 2-1 to 2-N, and the like, the virtual machine 24-1 inputs/outputs the business data to and from the device 22-1 such as a secondary storage device and a network interface device (Step S14 in FIG. 2). The secondary storage device is, for example, a hard disc drive or a USB memory.

Arbitrary business data input/output generated between the virtual machine 24-1 and the device 22-1 as mentioned above is monitored by the input/output monitoring unit 231-1 of the virtualizing unit 23-1. The input/output monitoring unit 231-1, when detecting the input/output of the business data, judges at first whether it is the business data output from the virtual machine 24-1 to the device 22-1 or the business data input from the device 22-1 to the virtual machine 24-1 (Step S15 in FIG. 2).

In the case of the business data output, the input/output monitoring unit 231-1 transfers the business data, which is outputted to the device 22-1, to the encryption processing unit 232-1 and instructs the encryption processing unit 232-1 to encrypt the business data (Step S16 in FIG. 2). Then, the encryption processing unit 232-1 encrypts the business data by using the encryption key distributed in the process of the step S2 and then outputs the encrypted business data to the device 22-1 (Step S17 in FIG. 2).

On the other hand, in the case of the business data input, the input/output monitoring unit 231-1 transfers the business data, which is inputted from the device 22-1, to the encryption processing unit 232 and instructs the encryption processing unit 232 to decrypt the business data (Step S18 in FIG. 2). Then, the encryption processing unit 232-1 decrypts the business data by using the encryption key distributed in the process of the step S2 and then inputs the decrypted business data to the virtual machine 24-1 (Step S19 in FIG. 2).

In the present exemplary embodiment, the above processes are similarly executed in the computers 2-2 to 2-N. Thus, the virtual machines 24-1 to 24-N in the computers 2-1 to 2-N can transmit/receive the business data to and from each other through the network interface device and share the business data by using the detachable secondary storage device such as USB memory, CD-R and the like.

Also, in the present exemplary embodiment, in the network or secondary storage device as a distribution route, the business data as a target of sharing is encrypted based on the encryption key distributed in the process of the step S2. Thus, it is possible to prevent the leak of the business data, which is accompanied by a peek at the network, a miss of the secondary storage device, or the like.

As mentioned above, the information sharing system according to the first exemplary embodiment of the present invention contains: the project managing unit 11; the key managing unit 12; the virtualizing units 23-1 to 23-N, which have the input/output monitoring units 231-1 to 231-N and the encryption processing units 232-1 to 232-N; and the virtual machines 24-1 to 24-N.

Also, the information sharing system according to the first exemplary embodiment of the present invention is operated as described below by using the aforementioned configuration.

(a) The project managing unit 11 authenticates the users of the virtual machines 24-1 to 24-N and specifies the project to which the users belong.

(b) The key managing unit 12 distributes the encryption key, which is assigned in advance to the project specified by the project managing unit 11, to the encryption processing units 232-1 to 232-N of the virtualizing units 23-1 to 23-N.

(c) The input/output monitoring units 231-1 to 231-N of the virtualizing units 23-1 to 23-N receive the input/output data generated between the virtual machines 24-1 to 24-N and the devices 22-1 to 22-N, and deliver the input/output data to the encryption processing units 232-1 to 232-N.

(d) The encryption processing units 232-1 to 232-N encrypt the output (write) data and decrypt the input (read) data by using the distributed encryption key.

The information sharing system according to the first exemplary embodiment of the present invention employs the aforementioned configuration. Thus, in the information sharing among the computers 2-1 to 2-N through the devices 22-1 to 22-N such as the secondary storage devices, the network interfaces and the like, the business data on the distribution route can be always set at encrypted state which is provided by using the key specific to the project, and the virtual machines 24-1 to 24-N used by the project members can access the properly decrypted business data. Hence, all of the requirements of the neutrality from the information sharing unit, the neutrality from the application, and the robustness are satisfied.

In this way, in the present exemplary embodiment, by using the encryption key assigned to every business project in the project managing unit 11, the business data is encrypted and decrypted in the virtualizing units 3-1 to 23-N contained in the computers 2-1 to 2-N that are used by the project members. Thus, the information sharing closed to the specific business project can be safely realized without depending on application or OS that is used in the business.

Second Exemplary Embodiment

Figure 4:
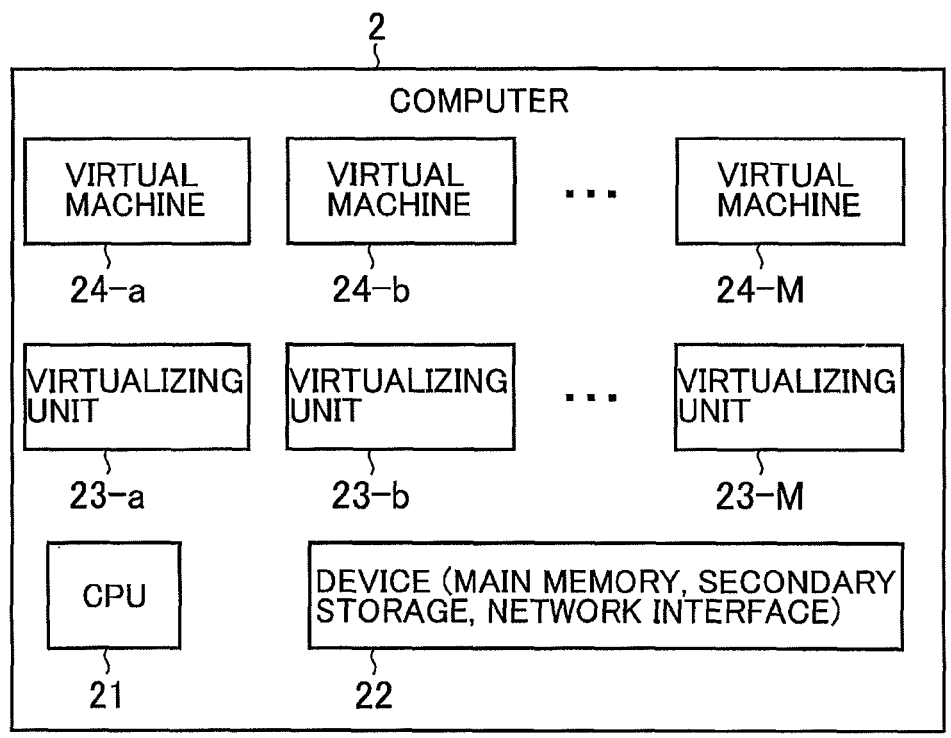
FIG. 4 is a block diagram showing a configuration example of an information sharing system according to a second exemplary embodiment of the present invention.

FIG. 4 is a block diagram showing a configuration example of an information sharing system according to a second exemplary embodiment of the present invention. In FIG. 4, the information sharing system according to the second exemplary embodiment of the present invention contains in a computer 2, a plurality of virtual machines 24-a to 24-M and virtualizing units 23-a to 23-M corresponding thereto.

That is, in the first exemplary embodiment of the present invention, the computers 2-1 to 2-N contain the virtual machines 24-1 to 24-N, respectively. However, each computer may contain the plurality of virtual machines, as described in the present exemplary embodiment. At this time, preferably, the virtualizing units 23-a to 23-M are correlated to the virtual machines 24-a to 24-M, respectively, and virtualizing units 23-a to 23-M execute operations as same as the operations according to the first exemplary embodiment of the present invention every time when a user of the computer 2 requests the start of the virtual machines 24-a to 24-M. Thus, when the user participates in a plurality of business projects, the user can carry out activities for the respective projects in parallel by using one computer 2.

Third Exemplary Embodiment

Figure 5:
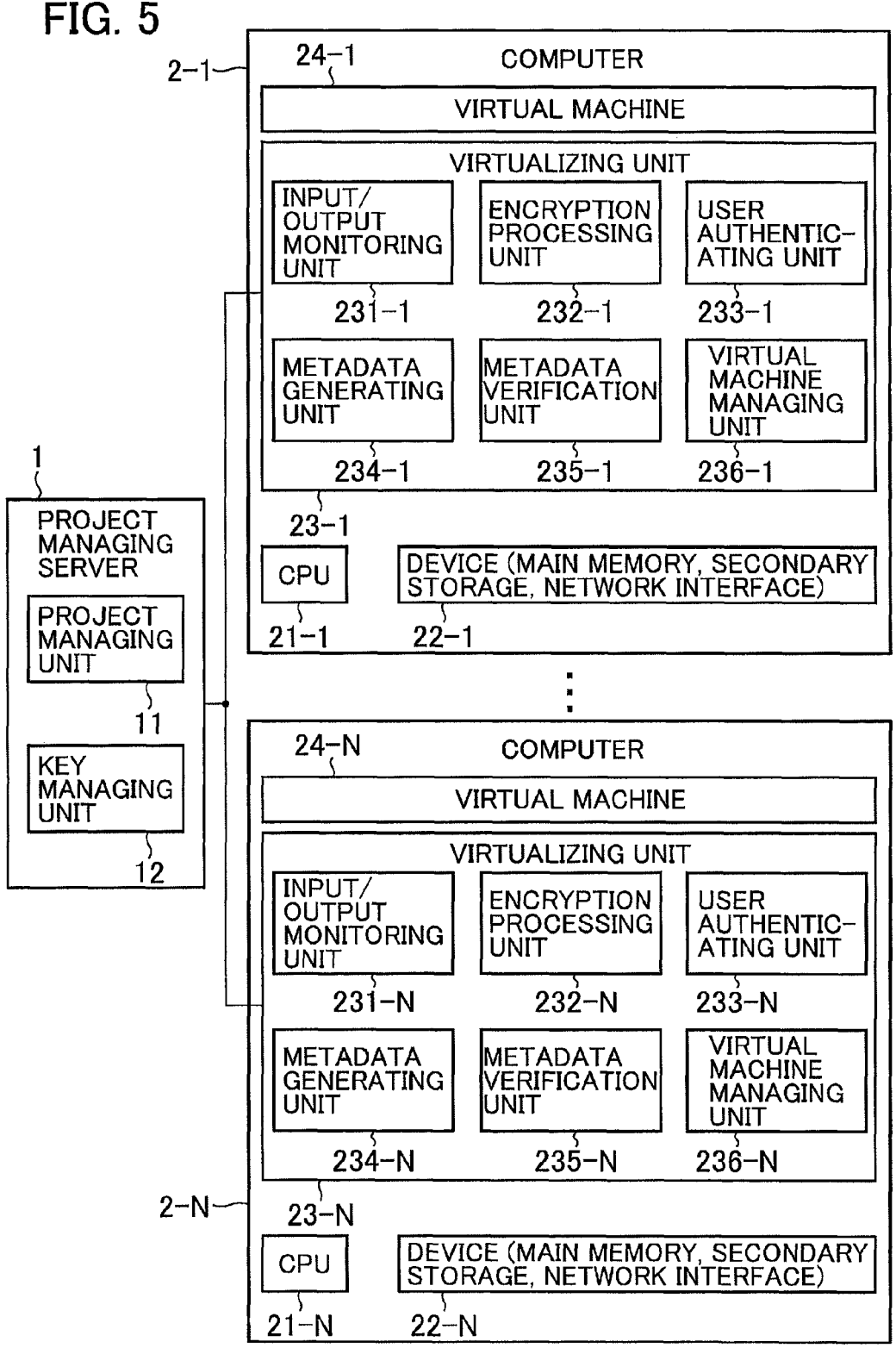
FIG. 5 is a block diagram showing a configuration example of an information sharing system according to a third exemplary embodiment of the present invention.

FIG. 5 is a block diagram showing a configuration example of an information sharing system according to a third exemplary embodiment of the present invention. In FIG. 5, a configuration of the information sharing system according to the second exemplary embodiment of the present invention is same as the configuration of the information sharing system according to the first exemplary embodiment of the present invention shown in FIG. 1, except that metadata generating units 234-1 to 234-N, metadata verification units 235-1 to 235-N and virtual machine managing units 236-1 to 236-N are added to the virtualizing units 23-1 to 23-N of the computers 2-1 to 2-N. The same numerals are assigned to the same configuration elements.

The encryption processing units 232-1 to 232-N generate encapsulated business data from sets of business data and metadata inputted from the metadata generating units 234-1 to 234-N by encrypting the business data, and output the encapsulated business data to the device 22-1 to 22-N. Also, in response to requests from the metadata verification units 235-1 to 235-N, the encryption processing units 232-1 to 232-N decrypt the encrypted business data in the encapsulated business data and output the decrypted business data to the virtual machines 24-1 to 24-N.

The metadata generating units 234-1 to 234-N generate the metadata based on the business data inputted from the input/output monitoring units 231-1 to 231-N and attribute information of the virtual machines 24-1 to 24-N obtained from the virtual machine managing units 236-1 to 236-N. The metadata generating units 234-1 to 234-N input the sets of the metadata and the business data to the encryption processing units 232-1 to 232-N and then instruct the encryption processing units 232-1 to 232-N to generate the encapsulated business data.

The metadata verification units 235-1 to 235-N compare the metadata of the encapsulated business data inputted from the input/output monitoring units 231-1 to 231-N with the attribute information of the virtual machines 24-1 to 24-N obtained from the virtual machine managing units 236-1 to 236-N.

The metadata verification units 235-1 to 235-N input the encrypted business data to the encryption processing units 232-1 to 232-N to decrypt the encrypted business data to the original business data in the case of hit. The metadata verification units 235-1 to 235-N output the inputted encapsulated business data to the virtual machines 24-1 to 24-N without decrypting in the case of not-hit.

The virtual machine managing units 236-1 to 236-N store the attribute information of the virtual machine 24, which include the project information and the like, in a non-volatile memory or secondary storage device which is contained inside, and reply the attribute information in response to requests from the metadata generating units 234-1 to 234-N and the metadata verification units 235-1 to 235-N.

Figure 6:
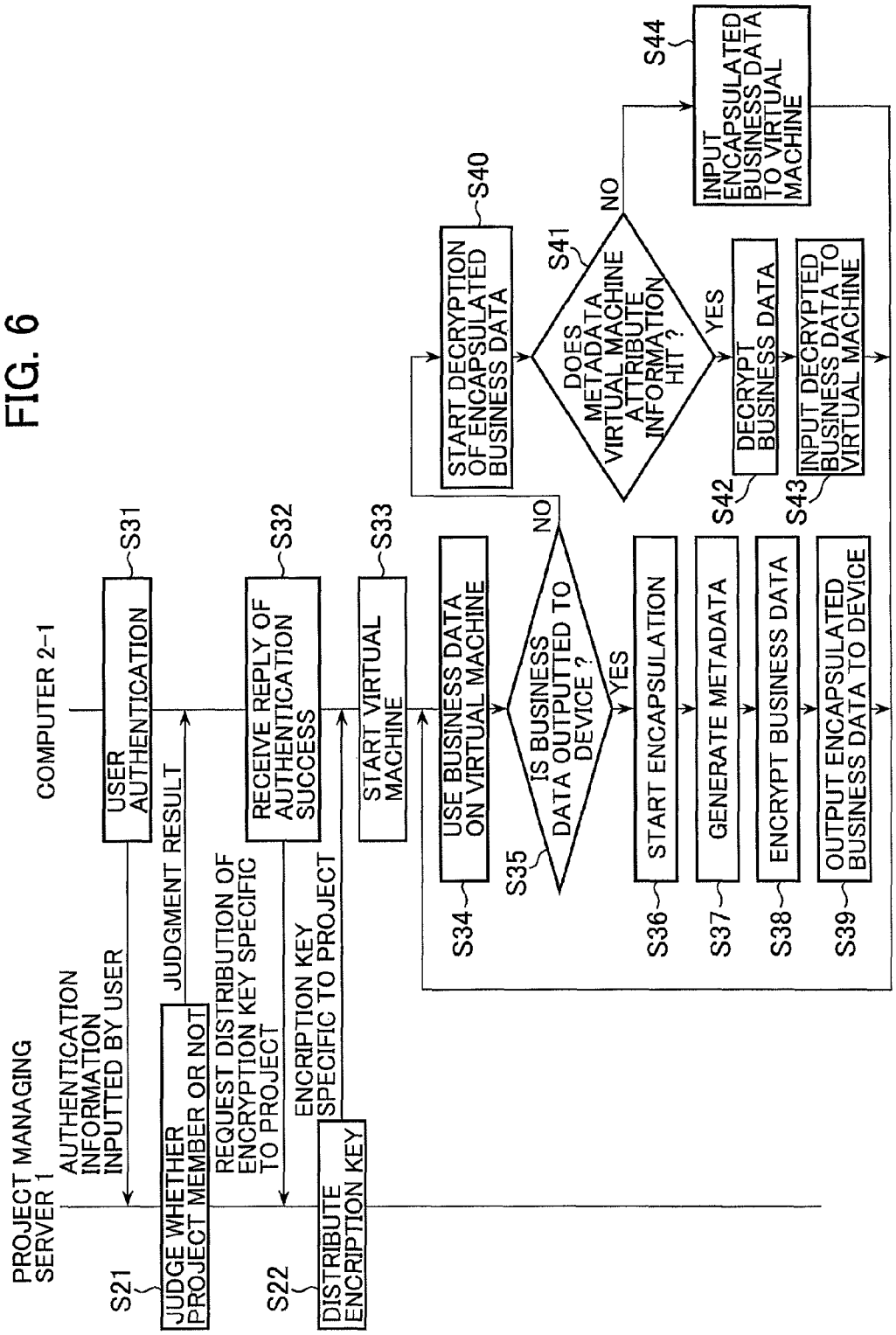
FIG. 6 is a sequence chart showing operations of the information sharing system according to the third exemplary embodiment of the present invention.
Figures 7, 8:
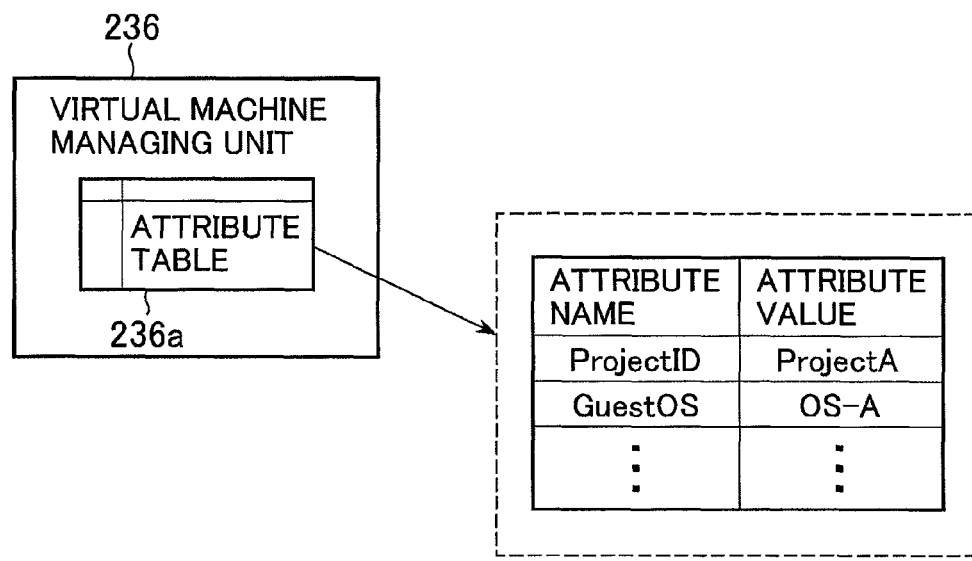
FIG. 7 shows one example of an attribute table of a virtual machine in the third exemplary embodiment of the present invention.
FIG. 8 shows a description example of metadata in the third exemplary embodiment of the present invention.
Figure 9:
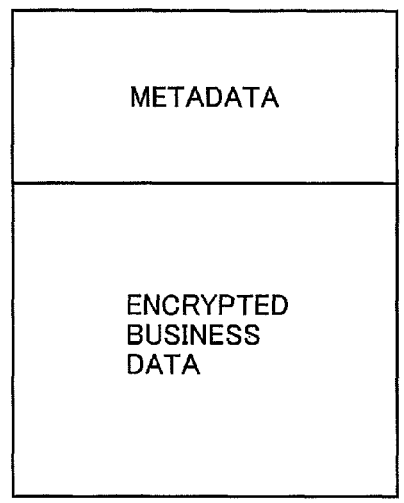
FIG. 9 shows a structure of an encapsulated business data in the third exemplary embodiment of the present invention.

FIG. 6 is a sequence chart showing operations of the information sharing system according to the third exemplary embodiment of the present invention. FIG. 7 shows one example of an attribute table of the virtual machine in the third exemplary embodiment of the present invention. FIG. 8 shows a description example of the metadata in the third exemplary embodiment of the present invention. FIG. 9 shows a structure of the encapsulated business data in the third exemplary embodiment of the present invention.

Operations of the information sharing system according to the third exemplary embodiment of the present invention will be described with reference to FIGS. 5 to 9. By the way, the respective operations of the project managing server 1 and the computer 2-1 shown in FIG. 6 can be implemented by executing programs executable by computers. Also, in FIG. 6, processes of steps S21, S22 and steps S31 to S35 are same as the processes of the steps S1, S2 and the steps S11 to S15 as mentioned above. Thus, explanations about those processes are omitted.

As an operation when the business data is outputted, at first, the input/output monitoring unit 231-1 starts the generation of encapsulated business data by transferring business data, which is outputted to the device 22-1 by the virtual machine 24-1, to the metadata generating unit 234-1 (Step S6 in FIG. 6).

Then, the metadata generating unit 234-1 obtains attribute information of the virtual machine 24-1 from the virtual machine managing unit 236-1 and generates metadata based on the attribute information (Step S37 in FIG. 6). Here, the attribute information of the virtual machine 24-1 includes at least an identifier specific to the project (Project ID) and is stored as the attribute table shown in FIG. 7, which has an attribute name and an attribute value as items, in a non-volatile memory or secondary storage device inside the virtual machine managing unit 236-1. Also, the metadata has a format of an XML (eXtensible Mark-up Language) type, for example, as shown in FIG. 8. The metadata generating unit 234-1 may gene rate and describe dynamic attribute information such as date and time of update (<Date>Tag) and the like, in addition to the project ID (<ProjectID>Tag) obtained from the virtual machine managing unit 236-1.

Next, the metadata generating unit 234-1 inputs the business data obtained in the process of the step S36 and the metadata generated in the process of the step S37 to the encryption processing unit 232-1 and instructs the encryption processing unit 232-1 to encrypt the encapsulated business data (Step S38 in FIG. 6). Then, similarly to the process of the step S16 in the first exemplary embodiment of the present invention, the encryption processing unit 232-1 encrypts the business data by using the encryption key distributed by the project managing server 1, links the metadata and the encrypted business data as shown in FIG. 9, and then outputs the metadata and the encrypted business data to the device 22-1 (Step S39 in FIG. 6).

On the other hand, as an operation when the business data is inputted, at first, the input/output monitoring unit 231-1 starts a decryption of the encapsulated business data by transferring the encapsulated business data, which is read from the device 22-1 by the access of the virtual machine 24-1, to the metadata verification unit 235-1 (Step S40 in FIG. 6).

The metadata verification unit 235-1 firstly extracts the metadata from the inputted encapsulated business data and compares the metadata with the attribute information of the virtual machine 24-1 obtained from the virtual machine managing unit 236-1 (Step S41 in FIG. 6). If there are a plurality pieces of attribute information, as mentioned above, the metadata verification unit 235-1 judges whether hit or not by comparing at least the project IDs in character-string. Or, whether hit or not may be judged by using a predetermined comparison condition equation and other attribute information such as the date and time of update.

After that, when the attribute information hits, the metadata verification unit 235-1 extracts the encrypted business data from the encapsulated business data, and then, inputs the encrypted business data to the encryption processing unit 232-1 and instructs the encryption processing unit 232-1 to decrypt (Step S42 in FIG. 6). At this time, the encryption processing unit 232-1 decrypts the encrypted business data to the original business data through an operation same as the above-mentioned operation of the step S18 in the first exemplary embodiment of the present invention, and input the original business data to the virtual machine 24-1 (Step S43 in FIG. 6).

On the other hand, when the attribute information does not hit in the operation of the step S41, the metadata verification unit 235-1 immediately inputs the encapsulated business data to the virtual machine 24-1 (Step S44 in FIG. 6).

In this way, in the present exemplary embodiment, only the virtual machines 24-1 to 24-N used by the specific project members can share the decrypted business data through a general file server, a general mail server, or the like.

The information sharing system according to the third exemplary embodiment of the present invention contains in the virtualizing units 23-1 to 23-N, the metadata generating units 234-1 to 234-N, the metadata verification units 235-1 to 235-N and the virtual machine managing units 236-1 to 236-N, in addition to the configuration of the information sharing system according to the first exemplary embodiment of the present invention.

The information sharing system according to the third exemplary embodiment of the present invention is operated as described below by using the aforementioned configuration.

At first, a case is described in which the business data is outputted from the virtual machine.

(a) The input/output monitoring units 231-1 to 231-N of the virtualizing units 23-1 to 23-N, when detecting that one of the virtual machines 24-1 to 24-N outputs the business data to the devices 22-1 to 22-N such as secondary storage devices or network devices, inquire the virtual machine managing unit 236-1 to 236-N of the project information corresponding to the machine of the virtual machines 24-1 to 24-N. The virtual machine managing units 236-1 to 236-N manage correspondence relations between virtual machines 24-1 to 24-N and the project.

(b) The input/output monitoring units 231-1 to 231-N output the set of the above-mentioned business data and project information to the metadata generating units 234-1 to 234-N.

(c) After the metadata generating units 234-1 to 234-N generate the metadata corresponding to the business data including the project information, the encryption processing units 232-1 to 232-N encrypt only the business data. The metadata generating units 234-1 to 234-N generate the sets (the encapsulated business data) of the metadata and the encrypted business data, and then output those as integrated data to the devices 22-1 to 22-N as destination of output.

A case is described in which the business data is inputted to the virtual machine.

(d) The input/output monitoring units 231-1 to 231-N of the virtualizing units 23-1 to 23-N, when detecting the input of the business data from the devices 22-1 to 22-N such as secondary storage devices or network devices to the virtual machines 24-1 to 24-N, inquire the virtual machine managing unit 236-1 to 236-N of the project information corresponding to the virtual machines 24-1 to 24-N.

(e) The input/output monitoring units 231-1 to 231-N delivers the project information and the encapsulated business data read from the devices 22-1 to 22-N to the metadata verification units 235-1 to 235-N.

(f) The metadata verification units 235-1 to 235-N compare the project information of the virtual machines 24-1 to 24-N with the project information included in the metadata of the encapsulated business data.

(g) When the project information coincide with each other, the metadata verification units 235-1 to 235-N delivers the encrypted business data to the encryption processing units 232-1 to 232-N. The encryption processing units 232-1 to 232-N restore the original business data and transfer the original business data to the virtual machines 24-1 to 24-N.

(h) On the other hand, when the project information does not coincide, the metadata verification units 235-1 to 235-N transfer the encapsulated business data without decryption to the virtual machines 24-1 to 24-N.

Since the present exemplary embodiment employs such configurations, the original business data can be shared among virtual machines of the virtual machines 24-1 to 24-N, which belong to the same project, and the business data can be permitted to be shared as the capsulated business data in the state that the contents are concealed among virtual machines of the virtual machines 24-1 to 24-N, which belong to different projects.

Also, in the present exemplary embodiment, the information sharing through a file sharing server outside the project, an existing mail server, or the like can be safely realized. Thus, without lack of the three safe requirements, without limitation to the information sharing system closed to users and computers of a single project, it is possible to provide the information sharing system having a high degree of freedom, which allows the distribution through computers (an internet server, an electronic mail system or the like) outside the project.

As mentioned above, in the present exemplary embodiment, the virtual machine managing units 236-1 to 236-N manage the correspondence relations between the virtual machines 24-1 to 24-N and the business project. The metadata generating units 234-1 to 234-N hold the correspondence relation between the outputted business data and the business project as the metadata. The encryption processing units 232-1 to 232-N output the metadata and the encrypted business data as the integrated encapsulated business data to a computer outside the project.

For this reason, in the present exemplary embodiment, the encapsulated business data, in which the contents of the business data are concealed, is stored in or transferred to a computer outside the project, such as a mail server, and the decrypted business data can be used only after the encapsulated business data arrives at the virtual machines 24-1 to 24-N of the same project. Thus, for the sake of information sharing closed to the specific business project, without lack of safety, it is possible to provide the information sharing system through a computer outside the project, which having a high degree of freedom.

Fourth Exemplary Embodiment

Figure 10:
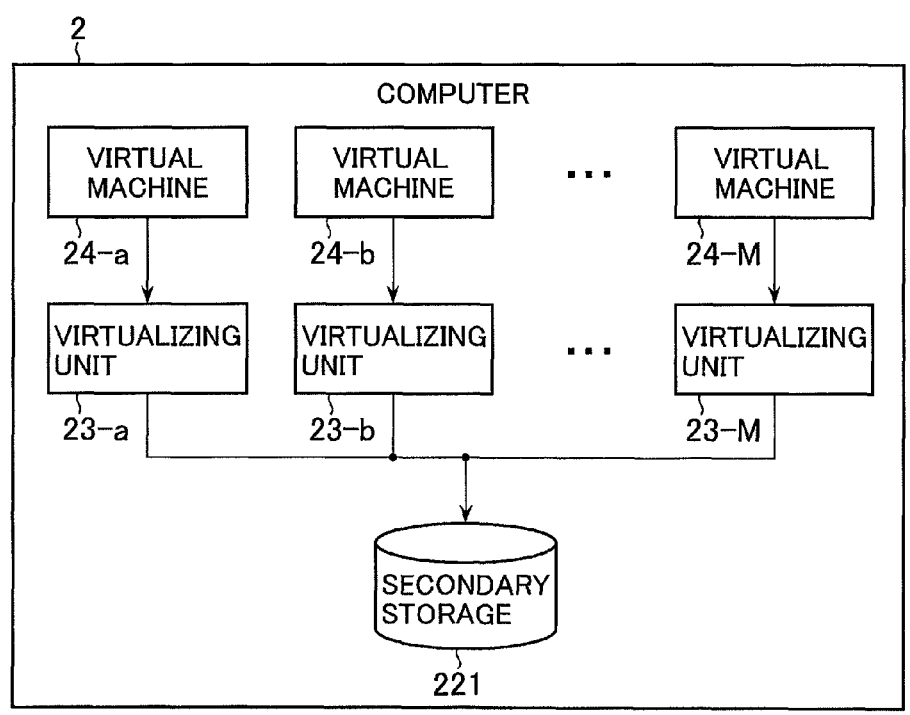
FIG. 10 is a block diagram showing a configuration example of an information sharing system according to a fourth exemplary embodiment of the present invention.

FIG. 10 is a block diagram showing a configuration example of an information sharing system according to a fourth exemplary embodiment of the present invention. In FIG. 10, the information sharing system according to the fourth exemplary embodiment of the present invention contains in the computer 2, the plurality of virtual machines 24-a to 24-M and the virtualizing units 23-a to 23-M respectively corresponding to the virtual machines 24-a to 24-M.

That is, in the third exemplary embodiment of the present invention, the computers 2-1 to 2-N contain the virtual machines 24-1 to 24-N, respectively. However, each computer may contain the plurality of virtual machines, as described in the present exemplary embodiment. At this time, preferably, the virtualizing units 23-a to 23-M are correlated to the virtual machines 24-a to 24-M, respectively, and virtualizing units 23-a to 23-M execute operations as same as the operations according to the third exemplary embodiment of the present invention every time when a user of the computer 2 requests the start of the virtual machines 24-a to 24-M. Thus, when the user participates in a plurality of business projects, the user can carry out activities for the respective projects in parallel by using one computer 2.

Also, because of the operations of the metadata verification unit 235 indicated at the steps S41 to S44, the plurality of virtual machines 24 belonging to different projects can share the same secondary storage device. For example, it is supposed that encapsulated business data C[A] is outputted by virtual machine 24-A of a project A and stored in a secondary storage device 221. When a virtual machine 24-B of a project B reads the encapsulated business data C[A], the encapsulated business data C[A] is not decrypted and is treated as a file (in which contents are encrypted). When the virtual machine 24-A reads the encapsulated business dataC [A], it is possible to directly refer to the decrypted original business data.

In this way, in the present exemplary embodiment, without lack of the safety, it is possible to provide the information sharing system, which has a higher degree of freedom, to a user participating in a plurality of projects.

Figure 11:
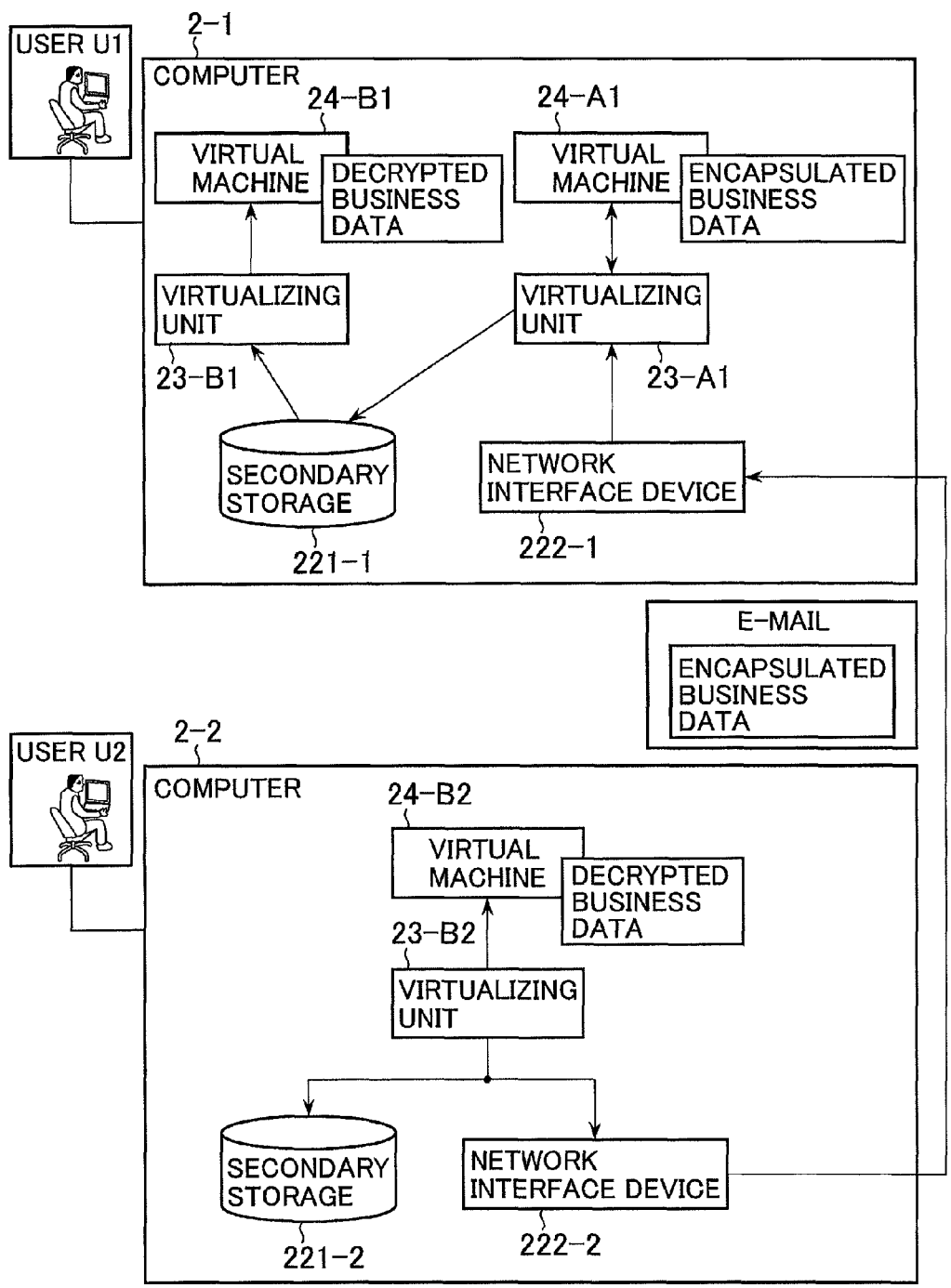
FIG. 11 is a block diagram showing a concrete operation example of the information sharing system according to the fourth exemplary embodiment of the present invention.

For example, as shown in FIG. 11, it is supposed that a user U1 is a member participating both of projects A and B and always uses a virtual machine 24-A1 of the project A for the sake of transmission/reception of electronic mails and the like. A virtual machine 24-B2, which is used by a user U2 of the project B, transmits an electronic mail to which encapsulated business data is attached. A mail application operated on the virtual machine 24-A receives the electronic mail.

At this time, in the virtual machine 24-A1, the encapsulated business data received from a network interface device 222-1 is caught by the mail application without decryption, and the encapsulated business data is stored as it is in a shared secondary storage device 221-1.

When the user U1 uses the virtual machine 24-B1 to read the encapsulated business data, it is properly decrypted to the original business data. Thus, the user U1 can carry out activities such as browsing and editing as a member of the project B. Furthermore, when the user U1 transfers the electronic mail to a user U3 who is another member of the project B, the electronic mail can be directly transferred from the mail application on the virtual machine 24-A1 which is always used.

However, even if the mail program is operated by mistake to transfer the electronic mail to non-member of the project B or to a mailing list in which members of various projects are listed, any virtual machine 24 of the destination of the transfer cannot decrypt the encapsulated business data which is encrypted by using the encryption key of the project B.

Fifth Exemplary Embodiment

Figure 12:
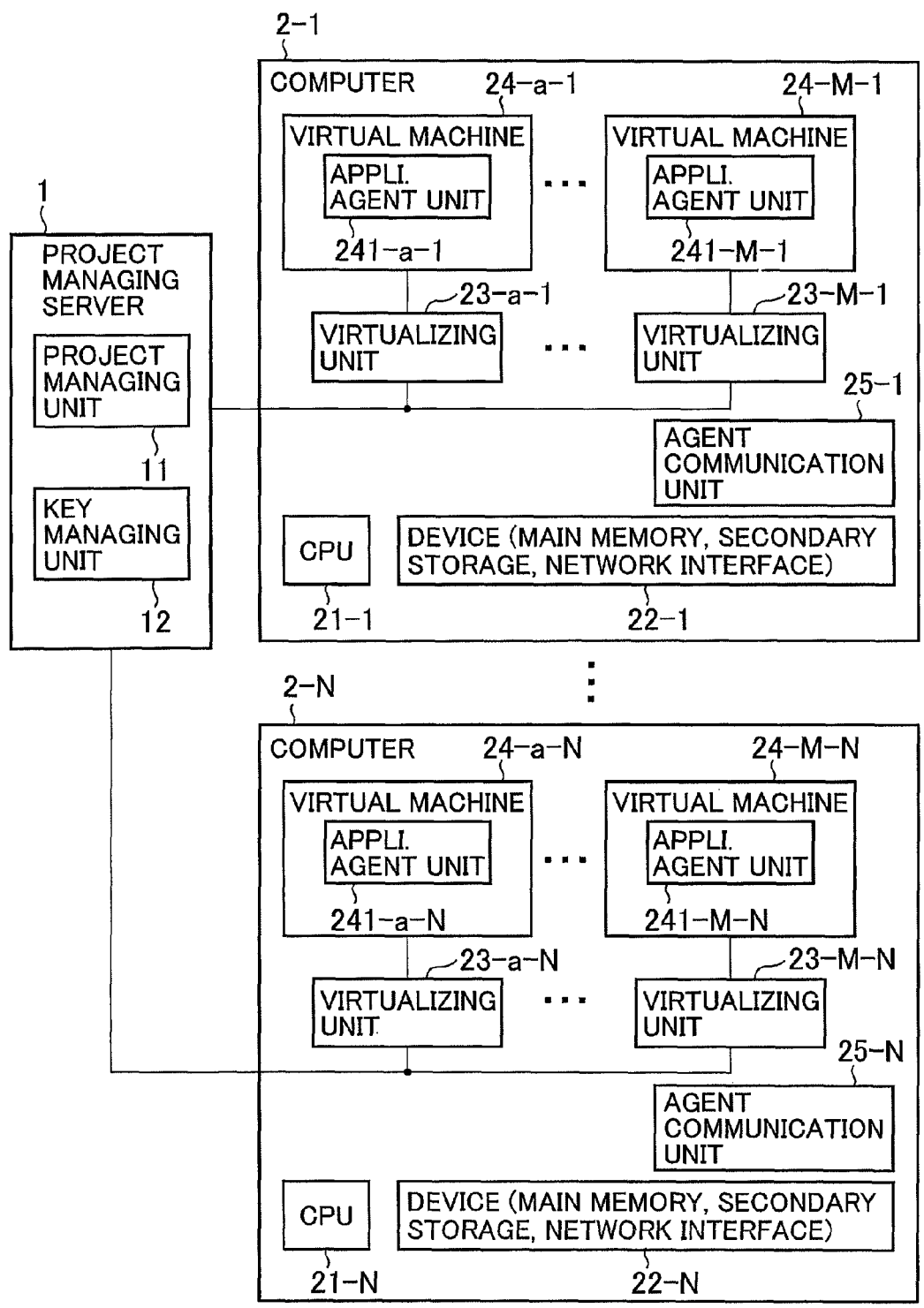
FIG. 12 is a block diagram showing a configuration example of an information sharing system according to a fifth exemplary embodiment of the present invention.

FIG. 12 is a block diagram showing a configuration example of an information sharing system according to a fifth exemplary embodiment of the present invention. In FIG. 12, in the information sharing system according to the fifth exemplary embodiment of the present invention, the computers 2-1 to 2-N include a plurality of virtual machines 24-$a$-1 to 24-M-1, . . . , 24-$a$-N to 24-M-N, respectively. The virtual machines 24-$a$-1 to 24-M-1, . . . , 24-$a$-N to 24-M-N contain application agent units 241-$a$-1 to 241-M-1, . . . , 241-$a$-N to 241-M-N, respectively.

Also, in the present exemplary embodiment, the virtualizing units 23-$a$-1 to 23-M-1, . . . , 23-$a$-N to 23-M-N according to the second exemplary embodiment of the present invention are provided to the virtual machines 24-$a$-1 to 24-M-1, . . . , 24-$a$-N to 24-M-N in one to one correspondence. Furthermore, agent communication units 25-1 to 25-N are provided.

Between the application agent units 241-$a$-1 to 241-M-1, . . . , 241-$a$-N to 241-M-N mutually transfer user interface information including a user interface screen provided by an application, a user input/output device signal to an application for a keyboard, a mouse, or the like, and the like with the application agent units on other virtual machines.

The agent communication units 25-1 to 25-N distribute the user interface information among the application agent units 241-$a$-1 to 241-M-1, . . . , 241-$a$-N to 241-M-N.

Figure 13:
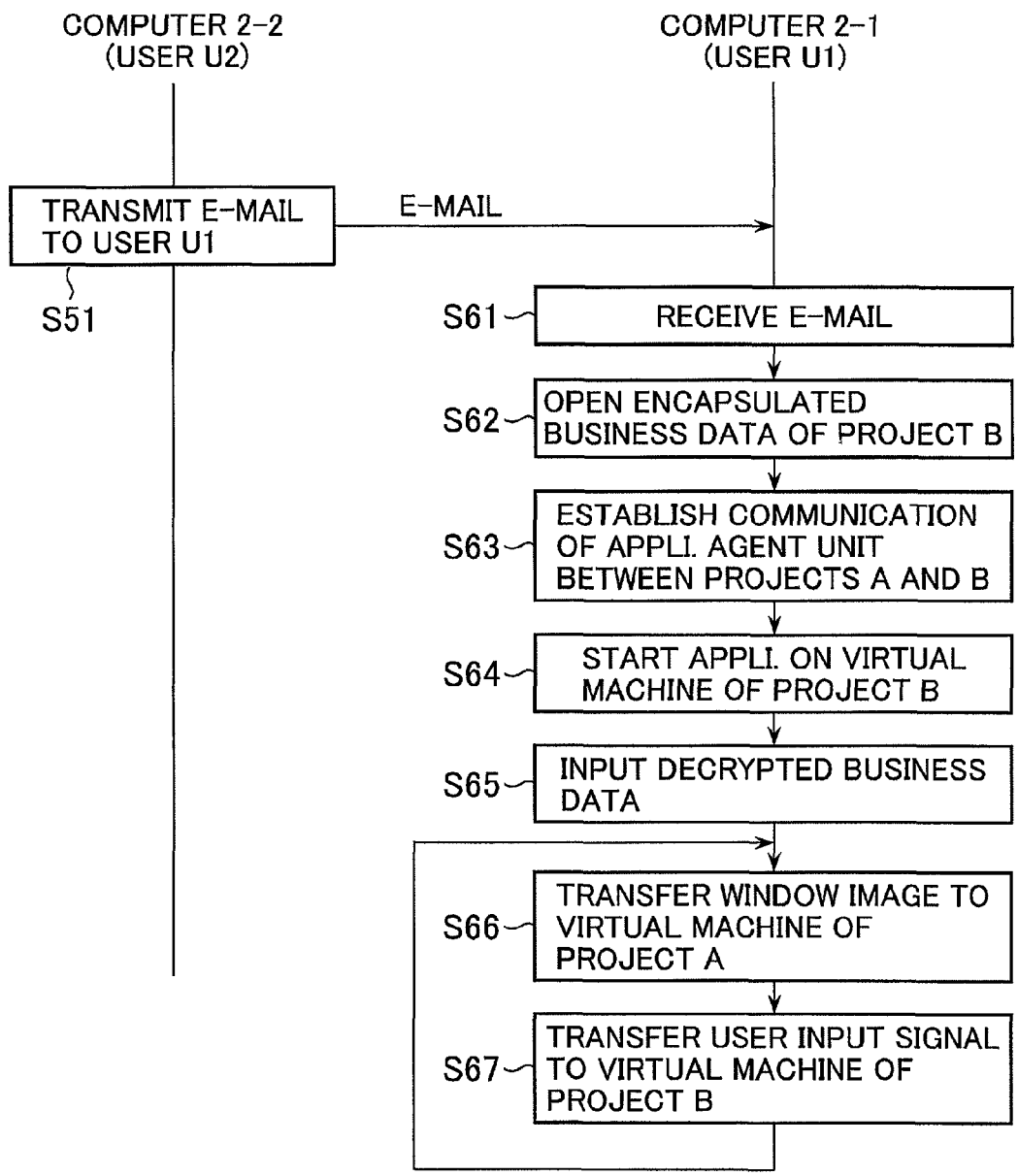
FIG. 13 is a sequence chart showing operations of the information sharing system according to the fifth exemplary embodiment of the present invention.
Figure 14:
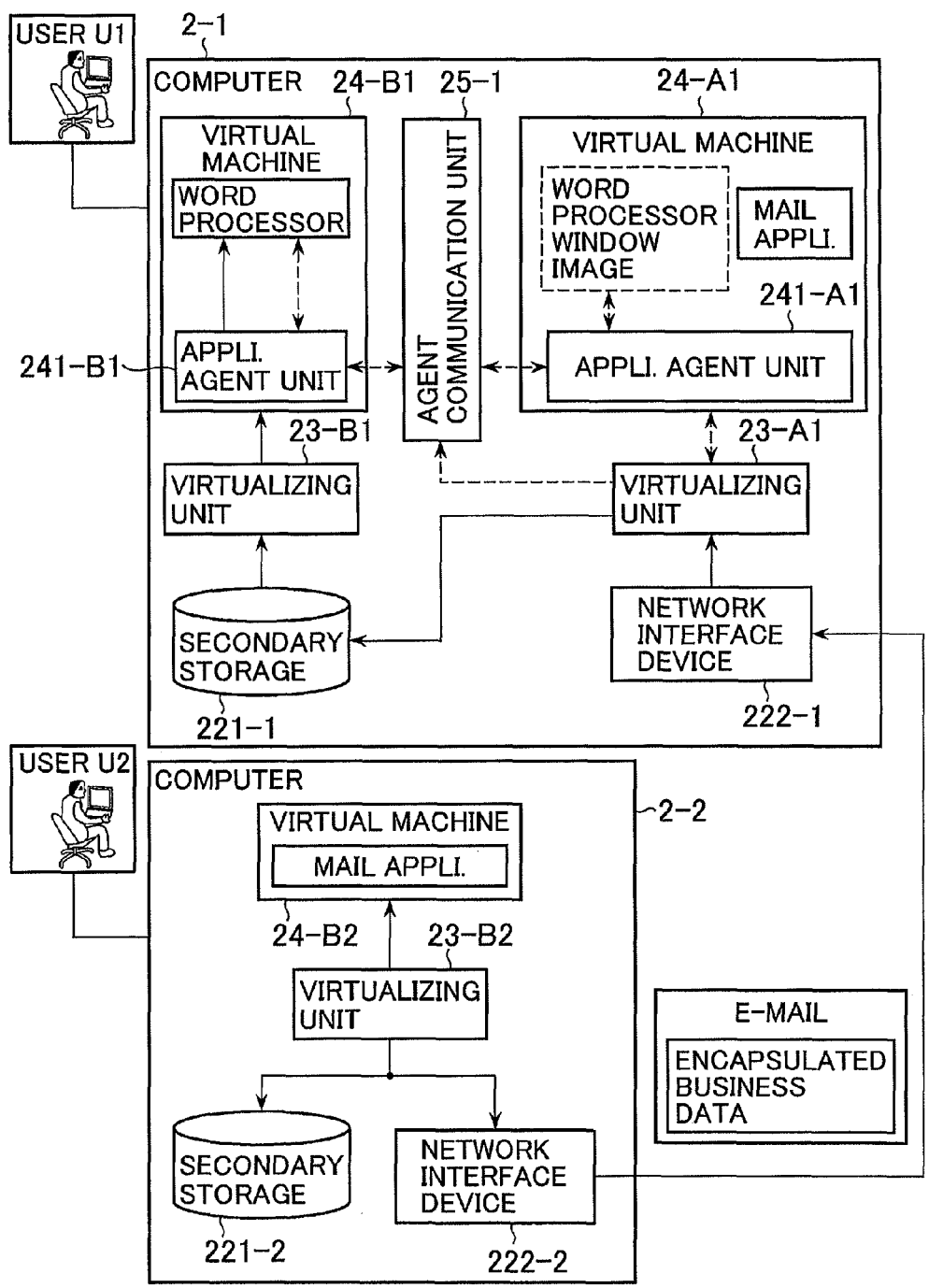
FIG. 14 is a block diagram showing a concrete operation example of the information sharing system according to the fifth exemplary embodiment of the present invention.

FIG. 13 is a sequence chart showing operations of the information sharing system according to the fifth exemplary embodiment of the present invention. FIG. 14 is a block diagram showing a specific operation example of the information sharing system according to the fifth exemplary embodiment of the present invention. Operations of the information sharing system according to the fifth exemplary embodiment of the present invention will be described below with reference to FIGS. 12 to 14. By the way, the respective operations of the computers 2-1, 2-1 in FIG. 13 can be implemented by executing programs executable by computers.

A case shown in FIG. 14 is supposed. That is, a user U1 of the computer 2-1 participates in both of projects A and B, and uses a virtual machine 24-A1 for the project A to transmit and receive electronic mails. Furthermore, the user U1 receives a mail to which business data is attached, from a virtual machine 24-B2 of the computer 2-2 used by a user U2 as another member of the different project B, and then operates the attached business data. At this time, the information sharing system according to the fifth exemplary embodiment of the present invention is operated based on a flow shown in FIG. 13.

At first, when the user U2 uses a mail application on the virtual machine 24-B2 to transmit business data of the project B to the user U1, a virtualizing unit 23-B2 corresponding to the virtual machine 24-B2, in accordance with the operations of the steps S36 to S39 in the third exemplary embodiment of the present invention, generates encapsulated business data which includes in metadata a project ID corresponding to the project B and transmits the encapsulated business data as an electronic mail (Step S51 in FIG. 13).

Next, the user U1 uses a mail application on the virtual machine 24-A1 to receive the electronic mail from the user U2 (Step S61 in FIG. 13). At this time, a virtualizing unit 23-A1 corresponding to the virtual machine 24-A1 carries out the operations of the steps S40 to S44 in the third exemplary embodiment of the present invention. Thus, the data attached to the electronic mail has a format of the encapsulated business data on the mail application.

When the user U1 uses the mail application on the virtual machine 24-A1 to carry out an operation for "opening" the encapsulated business data, the virtual machine 24-A1 issues an execution request for the encapsulated business data (Step S62 in FIG. 13).

After that, after an input/output monitoring unit 231 of the virtualizing unit 23-A1 corresponding to the virtual machine 24-A1 transfers the encapsulated business data to a metadata verification unit 235, the metadata verification unit 235 detects that the business data of the project B is included in the encapsulated business data by referring to the metadata of the encapsulated business data. Then, communications between the application agent units 241-A1 and 241-B1 are started by the agent communication unit 25-1 (Step S63 in FIG. 13).

Then, the agent communication unit 25-1 instructs the application agent unit 241-B1 to start an application correlated to the encapsulated business data (Step S64 in FIG. 13). For example, when receiving a path name of the encapsulated business data from the agent communication unit 25-1, the application agent unit 241-B1 issue a shell command, such as "open (the path name of the encapsulated business data)", to a shell program such as a command prompt of Windows (registered trademark) or the like.

Since the virtual machine 24-B1 also issues an execution request for the encapsulated business data, the virtualizing unit 23-B1 outputs the decrypted business data to the virtual machine 24-B1, in accordance with the operations of the steps S36 to S39 in the third exemplary embodiment of the present invention (Step S65 in FIG. 13).

After that, the application agent unit 241-B1 firstly transfers a window image of the application through the agent communication unit 25-1 to the application agent unit 241-

A1 which serves as a pair together with the application agent unit 241-B1 (Step S66 in FIG. 13).

Moreover, the application agent unit 241-A1, while displaying the transferred window image on a desktop of the virtual machine 24-A1, transfers a signal, which indicates a user input performed with respect to the window image through a keyboard, a mouse or the like, through the agent communication unit 25-1 to the application agent unit 241-B1 (Step S67 in FIG. 13).

Hereafter, by repeating the operations of the steps S66, S67, the user U1 of the computer 2-1 can access the business data of the project B, on the desktop screen used for the project A. Thus, user convenience is improved.

Here, because of the operations of the application agent units 241-A1, 241-B1 and the agent communication unit 25-1, the application, which accesses the business data of the project B, is operated not on the virtual machine 24-A1 for the project A but on the virtual machine 24-B1 for the project B.

Thus, in the present exemplary embodiment, because of the operation of the virtualizing unit, the user U1 cannot illegally copy the business data between the virtual machines of different projects. Thus, it is possible to maintain the advantage of the high safety that is provided in the third exemplary embodiment of the present invention.

By the way, the business data may be allowed to be partially transferred between the application agent units 241-A1 and 241-B1 for the sake of copy-and-paste operation. In this case, preferably, it is required that a project managing server 1-A of the project A or a project managing server 1-B of the project B distributes a filtering policy, which describes conditions of allowance or rejection of the copy-and-paste operation, allowable copy direction (from the application agent unit 241-A1 to the application agent unit 241-B1, or from the application agent unit 241-B1 to the application agent unit 241-A1), and the like, to the agent communication unit 25-1, and the agent communication unit 25-1 performs communication control based on those conditions.

As mentioned above, in the information sharing system according to the fifth exemplary embodiment of the present invention, in addition to the configuration of the information sharing system according to the third exemplary embodiment of the present invention, the computers 2-1 to 2-N further contain the agent communication units 25-1 to 25-N, and the virtual machines 24-*a*-1 to 24-M-1, . . . , 24-*a*-N to 24-M-N contain the application agent units 241-*a*-1 to 241-M-1, . . . , 241-*a*-N to 241-M-N, respectively.

The information sharing system according to the fifth exemplary embodiment of the present invention is operated as described below by using the aforementioned configuration.

(a) The metadata verification unit 235, when detecting that a virtual machine 24(VM-A) of the project A accesses the encapsulated business data of the project B, requests the agent communication unit 25 to generate a communication path between the application agent units 241 in the respective virtual machines 24 of the projects A and B.

(b) The agent communication unit 25, after generating a buffer for communication, instructs the application agent unit 241 in a virtual machine 24 (VM-B) of the project B to access the encapsulated business data of the project B.

(c) The application agent unit 241 in the virtual machine 24 (VM-B) of the project B starts and operates a predetermined application to access the encapsulated business data.

(d) Moreover, The application agent unit 241 in the virtual machine 24 (VM-B) of the project B transfer a window image of the application operated on the virtual machine 24 (VM-B) of the project B through the agent communication unit 25 to the application agent unit 241 of the virtual machine 24 (VM-A) of the project A.

(e) The application agent unit 241 in the virtual machine 24 (VM-A) of the project A renders the window image, which is transferred from the application agent unit 241 in the virtual machine 24 (VM-B) of the project B, on the desktop of the virtual machine 24 (VM-A) of the project A.

(f) After that, a signal from an input device, such as a keyboard, a mouse or the like, to the virtual machine 24 (VM-A) of the project A is transferred through the agent communication unit 25 to the virtual machine 24 (VM-B) of the project B.

(g) Hereafter, the aforementioned processes (d) to (f) are repeated.

Since the present exemplary embodiment employs such configurations, an end user can operate, through a single desktop provided by a virtual machine 24 (for example, VM-A) that corresponds to a main business project to which the end user belongs, business data of another project.

At this time, the (decrypted) business data of the other project is accessed only from another virtual machine 24 (for example, VM-B). Thus, it is possible to maintain an information leak protection performance same as the aforementioned information sharing systems according to the first to fourth exemplary embodiments of the present invention.

In this way, in the exemplary embodiment, the respective application agent units of the main virtual machine and the other virtual machine transfer through the agent communication unit to each other, the user interface screen of the application which accesses the business data and the user input signal from the keyboard or the like. Thus, while the business data of the plurality of projects are accessed by the respective virtual machines for the projects, the operations of the applications on the different virtual machines can be united on the single desktop. Thus, it is possible to provide the information sharing system having a high convenience, in which the business data of the plurality of business projects can be shared at the same time, through the single desktop, without lack of the safety.

The present invention can be applied to a personal computer for business use, which has a function of safe information sharing among business project members. Also, the present invention can be applied to a file server or thin client server for safely storing and accessing business data on the Internet.

A computer applicable to the aforementioned information sharing system is preferred to include: a virtual machine configured to provide a virtual machine environment; and a virtualizing unit. The virtualizing unit is preferred to include: an input/output monitoring unit which monitors input/output data between the virtual machine and a device; and an encryption processing unit which encrypts or decrypts, based on a monitoring result of the input/output monitoring unit, the input/output data in accordance with a direction of input/output by using predetermined encryption key.

The virtualizing unit is preferred to further include: a virtual machine managing unit which stores attribute information of the virtual machine; a metadata generating unit which generates metadata including the attribute information of the virtual machine and generates encapsulated data by linking the metadata and encrypted data encrypted by the encryption processing unit; and a metadata verification unit. When the input/output monitoring unit detects that the input/output data is input from the device to the virtual machine, the metadata verification unit compares the encrypted data in the encapsulated data with the attribute information of the virtual machine to determine whether the encrypted data in the encapsulated data to be decrypted or the encapsulated data to be transferred without decryption as data read from the device.

The virtualizing unit is preferred to further include: an agent communication unit which select a virtual machine required to access the encapsulated data based on the metadata in the encapsulated data and instruct the virtual machine required to access the encapsulated data to access; and an application agent unit which mutually transfers a window image of an application operated on another virtual machine and an input signal from a user input device.

A project managing server applicable to the above-mentioned information sharing system is preferred to be configured to be able to communicate with a computer including a virtual machine configured to provide a virtual machine environment. The project managing server is preferred to include: a project managing unit which manages and authenticates members of a business project based on authentication information from the computer; and a key managing unit which generates, updates, and manages an encryption key specific to the business project. The project managing server is preferred to supply the encryption key managed by the key managing unit to the computer.

Also, when in the computer including the virtual machine, the above-mentioned virtual machine environment is provided based on a program indicating a procedure for executing the following processes, the program is preferred to indicate the procedure to execute: monitoring input/output data between the virtual machine and a device; and encrypting or decrypting, based on a monitoring result of the monitoring, the input/output data in accordance with a direction of input/output by using predetermined encryption key.

Those skilled in the art can easily carry out various variations of the above-mentioned exemplary embodiments. Thus, the present invention is construed in the widest by the claims and equivalents thereof, without being limited to the above-mentioned exemplary embodiments. Also, this application is based upon and claims the benefit of priority from Japanese patent application No. 2007-136069, filed on May 23, 2007, the disclosure of which is incorporated herein in its entirety by reference.

The invention claimed is:

1. An information sharing device comprising:
a processor; and
instructions stored on a non-transitory medium, which when executed by the processor, cause the processor to perform the steps of:
monitoring data transfer between said virtual machine and a first device;
wherein the data transfer may comprise of encrypted or un-encrypted data;
encrypting, based on a monitoring result of said monitoring, said data transfer in accordance with a direction of transfer by using a predetermined encryption key;
decrypting, based on a monitoring result of said monitoring, said data transfer in accordance with a direction of transfer by using a predetermined encryption key;
creating an identification (ID) of a project;
associating the created ID of the project with said virtual machine;
affixing the associated ID of the project into virtual machine attribute information;
storing, in a memory, the virtual machine attribute information;
retrieving, from a memory, the stored virtual machine attribute information;
generating metadata by using the retrieved virtual machine attribute information;
creating, encapsulated data by linking said generated metadata and encrypted data encrypted in said encrypting;
determining that said monitoring detects the transfer of data between said virtual machine and the first device;
based on a determination that said monitoring detects the transfer of data between said virtual machine and the first device, comparing said generated metadata in said encapsulated data with said virtual machine attribute information;
determining whether or not at least said created project ID coincides with a project ID in said with said virtual machine attribute information;
determining whether said encrypted data in said encapsulated data is to be decrypted or said encapsulated data is to be transferred without decryption as data read from said first device; and
based on a determination that said encapsulated data is to be transferred without decryption, storing said encapsulated data in said first device.

2. The information sharing device according to claim 1, wherein the instructions stored on the non-transitory medium, when executed by the processor, further cause the processor to perform the steps of:
selecting a virtual machine required to access said encapsulated data based on said metadata in said encapsulated data;
accessing said encapsulated data to access said selected virtual machine; and
transferring an application screen image and user input data between said selected virtual machine and said virtual machine.

3. The information sharing method used for a system including a computer including a virtual machine configured to provide a virtual machine environment, in which said computer executes:
monitoring, by a processor, data transfer between said virtual machine and a first device;
wherein the data transfer may comprise of encrypted or un-encrypted data;
encrypting by the processor, based on a monitoring result of said monitoring, said data transfer in accordance with a direction of transfer by using a predetermined encryption key;
decrypting, by the processor, based on a monitoring result of said monitoring, said data transfer in accordance with a direction of transfer by using a predetermined encryption key;
creating, by the processor, an identification (ID) of a project;
associating, by the processor, the created ID of the project with said virtual machine;
affixing, by the processor, the associated ID of the project into virtual machine attribute information;
storing, in a memory, the virtual machine attribute information;
retrieving, from a memory, the stored virtual machine attribute information;
generating, by the processor, metadata by using the retrieved virtual machine attribute information;

creating, by the processor, encapsulated data by linking said generated metadata and encrypted data encrypted in said encrypting;

determining, by the processor, that said monitoring detects the transfer of data between said virtual machine and the first device;

based on a determination that said monitoring detects the transfer of data between said virtual machine and the first device, comparing, by the processor, said generated metadata in said encapsulated data with said virtual machine attribute information;

determining by the processor, whether or not at least said created project ID coincides with a project ID in said with said virtual machine attribute information;

determining, by the processor, whether said encrypted data in said encapsulated data is to be decrypted or said encapsulated data is to be transferred without decryption as data read from said first device; and based on a determination that said encapsulated data is to be transferred without decryption, storing said encapsulated data in said first device.

4. The information sharing method according to claim 3, wherein said computer further executes:

selecting, by the processor, a virtual machine required to access said encapsulated data based on said metadata in said encapsulated data;

accessing, by the processor, said encapsulated data to access said selected virtual machine; and transferring, by the processor, an application screen image and user input data between said selected virtual machine and said virtual machine.

\* \* \* \* \*